United States Patent [19]
Loren

[11] Patent Number: 5,447,762
[45] Date of Patent: Sep. 5, 1995

[54] METHOD AND SYSTEM FOR LOCALIZED FLUID-ASSISTED INJECTION MOLDING AND BODY FORMED THEREBY

[75] Inventor: Norman S. Loren, Warren, Mich.

[73] Assignee: Melea Limited, Southfield, Mich.

[21] Appl. No.: 56,590

[22] Filed: Apr. 30, 1993

Related U.S. Application Data

[60] Continuation of Ser. No. 800,072, Nov. 27, 1991, abandoned, which is a division of Ser. No. 351,271, May 10, 1989, Pat. No. 5,069,859, which is a continuation of Ser. No. 133,900, Dec. 16, 1987, abandoned.

[51] Int. Cl.$^6$ .............................. B65D 45/16
[52] U.S. Cl. ..................... 428/34.1; 428/35.7; 428/33; 428/36.9; 428/45; 428/66.7; 428/81; 428/121; 428/124; 428/128; 428/130; 428/188; 428/192; 220/569; 220/733; 220/908; 220/404
[58] Field of Search ............. 428/34.1, 35.7, 36.9, 428/33, 36.92, 45, 66, 81, 121, 124, 128, 130, 188, 192; 220/569, 733, 908, 404

[56] References Cited

U.S. PATENT DOCUMENTS

| | | | |
|---|---|---|---|
| 3,272,395 | 9/1966 | Lawyer | 220/733 |
| 3,703,255 | 11/1972 | Wade | 229/1.5 B |
| 3,956,550 | 5/1976 | Sutch | 428/81 |
| 4,001,471 | 1/1977 | Rumball | 428/60 |
| 4,420,168 | 12/1983 | Dewing | 280/43.1 |
| 4,609,125 | 9/1986 | Willingham | 220/324 |

FOREIGN PATENT DOCUMENTS

| | | | |
|---|---|---|---|
| 105858 | 4/1984 | European Pat. Off. | |
| 63-10293 | 5/1988 | Japan | B32B 27/32 |

*Primary Examiner*—Charles R. Nold
*Attorney, Agent, or Firm*—Brooks & Kushman

[57] ABSTRACT

A method and system are disclosed for locally introducing fluid, such as a gas, at a predetermined location into molten resin downstream from a resin injection aperture to form a hollow part. The gas is utilized at the localized area to distribute the molten resin, to eliminated molded in stress and to prevent formation of sink marks in the part during resin solidification. An overflow reservoir outside of the mold cavity is filled with the resin during resin injection and then the gas is introduced into the reservoir through a fluid aperture and into the part. The reservoir creates a cocoon of solidified material to act as a seal to prevent gas leakage. One hollow body formed by the method and system includes a substantially endless hollow body portion with a fluid opening for communicating the interior of the hollow body portion with the locally introduced fluid. The hollow body provides an internal gas manifold and means for greater structural integrity.

2 Claims, 5 Drawing Sheets

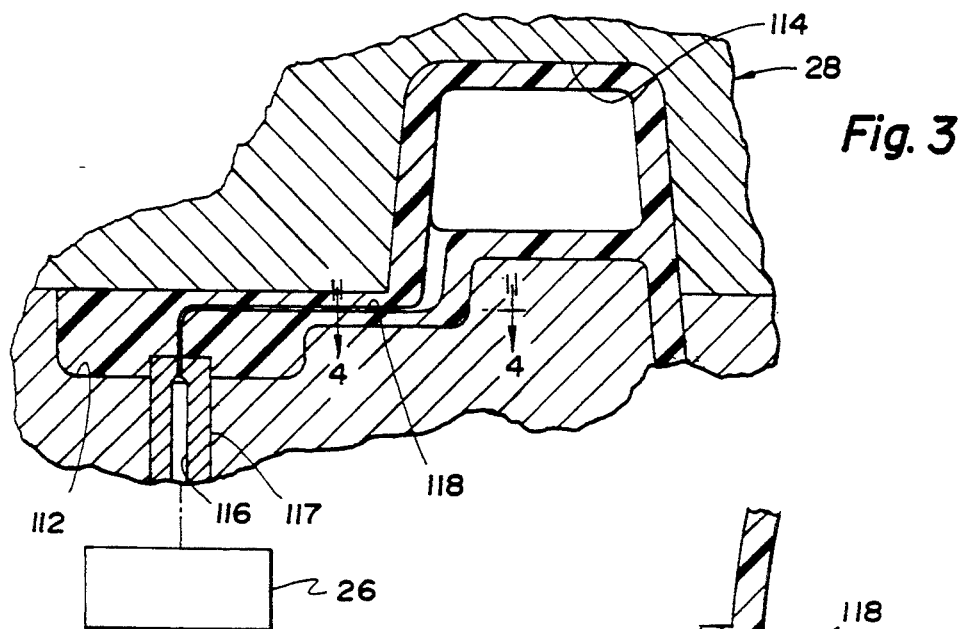
Fig. 3
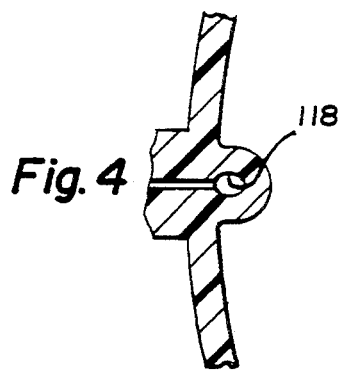
Fig. 4
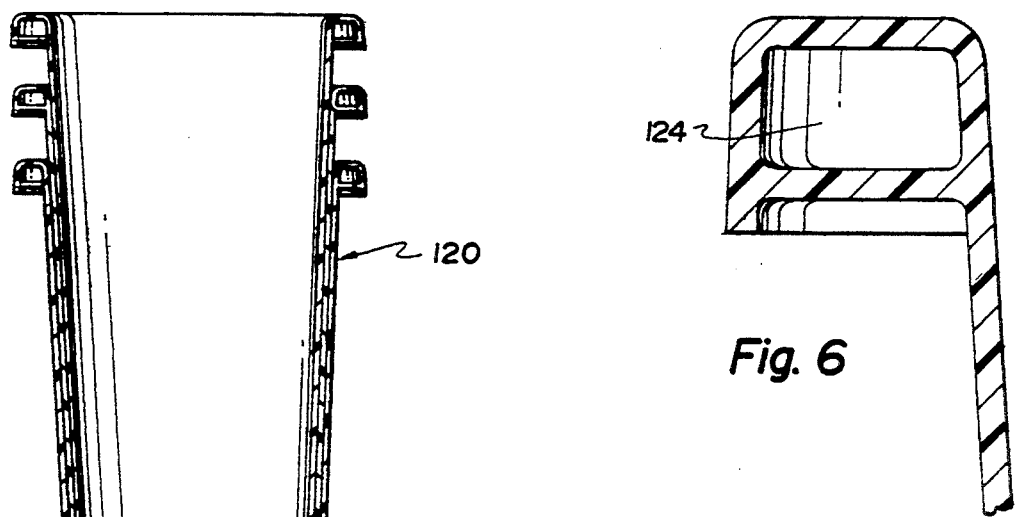
Fig. 5
Fig. 6

METHOD AND SYSTEM FOR LOCALIZED FLUID-ASSISTED INJECTION MOLDING AND BODY FORMED THEREBY

This is a continuation of application Ser. No. 07/800,072 filed on Nov. 27, 1991 abandoned, which is a division of Ser. No. 07/351,271, May 10, 1989, U.S. Pat. No. 5,069,859 which is a continuation of Ser. No. 07/133,900, Dec. 16, 1987, now abandoned.

TECHNICAL FIELD

This invention relates to a method and system for fluid assisted injection molding and body formed thereby and, in particular, to method and system for localized fluid assisted injection molding and body formed by the method and system.

BACKGROUND ART

It is well known in the plastic molding art to use pressurized fluid in conjunction with the injection molding of articles. The pressurized fluid is typically nitrogen gas which is introduced into the molten plastic.

Pressurized fluid serves many purposes. First, it allows the article so formed to have hollow interior portions which result in weight and material savings. Secondly, it minimizes the molded in stresses by eliminating high second stage injection pressure. This also reduces part weight in that the gas is used to fill out the part. Thirdly, the pressurized fluid applies outward pressure to force the plastic against the surfaces of the mold cavity while the article is setting up. This enhances surface quality by eliminating sink marks, especially in areas of the article having thicker plastic sections, such as structural ribs or bosses.

One problem associated with fluid-assisted injection molding is that some parts are of such a size and shape so as to reduce the benefits normally obtained from the use of fluid-assisted injection molding. For example, for some items it is near impossible for the gas introduced at the injection aperture to move to the farthest reaches of the mold cavity. Very complex channel configurations throughout the part would be required to put the gas in a local area where it is needed and to the farthest reaches of the mold.

U.K. Patent Application 2,139,548 discloses an injection molding process wherein pressurized fluid is injected into a stream of plastic material at one or more selected positions in the mold space.

U.S. Pat. No. 4,474,717 discloses a localized fluid-assisted injection molding method and system including a probe having a head with one or more fluid orifices. In one embodiment the probe is retractable.

West German Patent Document 2,106,546 discloses a method and apparatus for forming plastic shoe heels with compressed gas blown into the center of the plastic mass. The resulting hollow cavity is then filled with a synthetic foam.

Part requirements and tooling considerations (i.e. thin steel sections), however, may prevent the introduction of gas directly into the part.

DISCLOSURE OF THE INVENTION

The specific object of the present invention is to provide an improved method and system for making at least one body from plastic resin by injection molding wherein fluid is injected at a predetermined location into the resin melt flow in the mold at a location downstream from a resin injection aperture in the mold. The mold may have many cavities which, in turn, may have individual fluid entry orifices.

In carrying out the above object and other objects of the present invention, a method for making a hollow-shaped body from a plastic resin in a fluid assisted injection molding system is provided. The system includes a mold having an injection aperture, a body forming cavity and a resin reservoir outside of the cavity and in communication therewith. The method includes the step of injecting an amount of molten resin sufficient for the preparation of the body from an injection nozzle through the injection aperture, along a resin flow path and into the cavity in the mold, wherein the resin at least partially fills the reservoir. The method further includes the step of locally injecting a fluid into the resin in the reservoir through at least one fluid aperture in the mold to at least partially distribute the molten resin over interior surfaces defining the cavity whereby the body is formed within a predetermined portion of the cavity. The method also includes the steps of cooling the body so formed to a temperature beneath the softening point of the resin, relieving the pressure within the body and, finally, opening the mold to remove the body.

The injection molding system constructed in accordance with the present invention includes a source of fluid and an injection molding machine having a nozzle for injecting the molten resin. A fluid injecting mechanism is at least partially disposed in the mold for locally injecting fluid into the resin at the fluid aperture which is located remote from the injection aperture. The mold has at least one resin reservoir outside of the cavity and in communication therewith to receive the plastic resin, the reservoir communicating the fluid aperture and the mold cavity.

One hollow body formed by the method and system has a substantially endless hollow body portion formed within the body by the fluid.

In one embodiment, the mold has a spillover reservoir in communication with the cavity. Excess resin at least partially fills the spillover reservoir during distribution of the resin over the interior surfaces.

In another embodiment the fluid aperture is formed by a pin and the pressure is relieved through the pin.

The objects, features and advantages of the present invention are readily apparent from the following detailed description of the best mode for carrying out the invention when taken in connection with the following drawings.

BRIEF DESCRIPTION OF THE DRAWINGS

FIG. 3 is a schematic view, partially broken away and in cross-section, which illustrates the method and system of the present invention wherein local fluid injection is provided by creating an overflow reservoir outside of the cavity of the mold;

FIG. 4 is a view, partially broken away and in cross-section, of a portion of the body formed by the method and system of FIG. 3 taken along lines 4—4;

FIG. 5 is side cross-sectional view of a stack of plastic garbage cans constructed in accordance with the present invention;

FIG. 6 is an enlarged view, partially broken away and in cross-section, of an annular lip portion of one of the garbage cans;

BEST MODE FOR CARRYING OUT THE INVENTION

Figure 1:
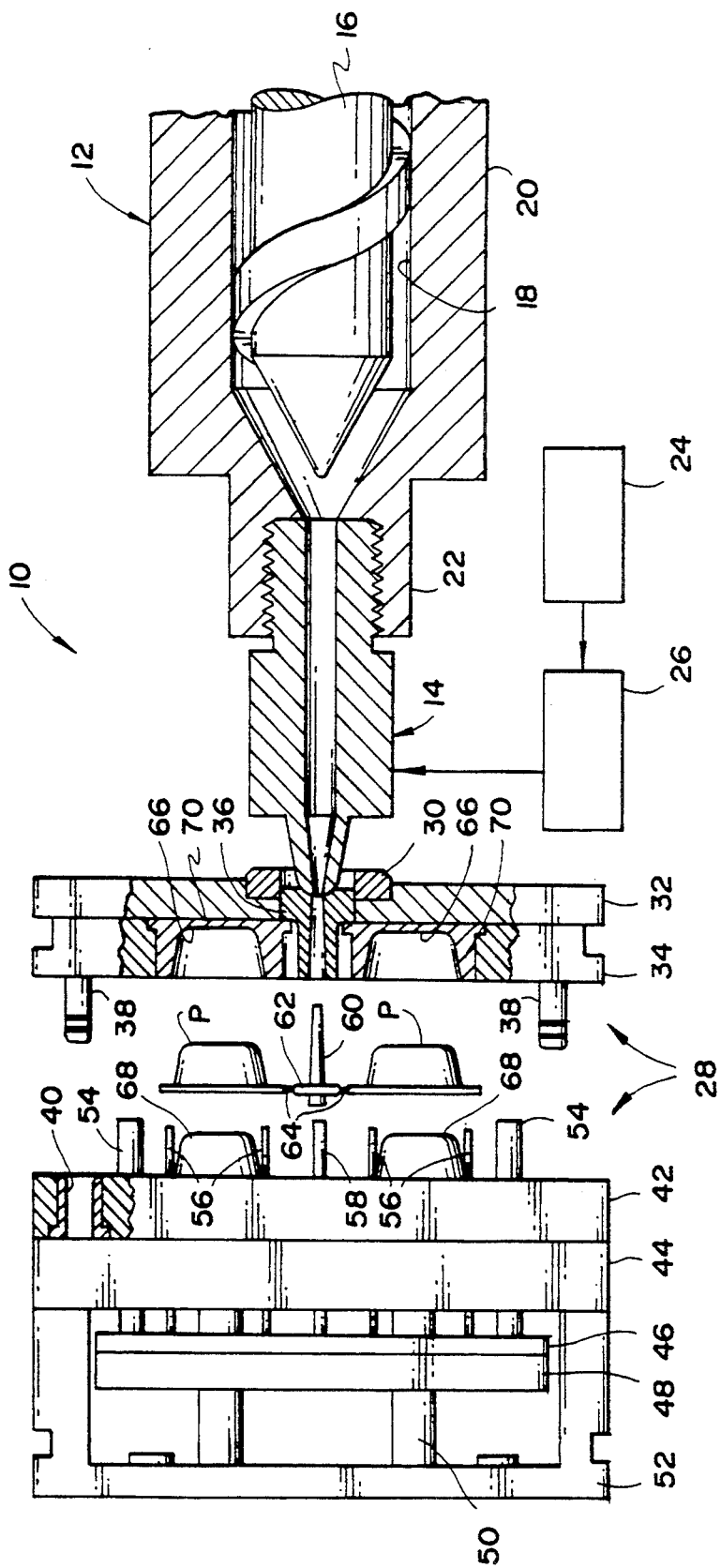
FIG. 1 is a schematic view, partially broken away and in cross-section, of a conventional fluid assisted injection molding system including a mold in its open position, a source of fluid and its associated control valve and an injection molding machine having a nozzle.

Referring now to FIG. 1, there is illustrated a conventional gas-assisted injection molding system, generally indicated at 10, for making a plastic body from plastic resin. A general understanding of the different components of the system 10 is useful in understanding the method and system of the present invention.

Briefly, the injection molding system 10 includes an injection molding machine, generally indicated at 12, having a nozzle, generally indicated at 14, for injecting predetermined amounts or shots of molten resin. The injection molding machine 12 includes a hydraulic screw ram 16 which is disposed in a bore 18 formed in a barrel 20 of the injection molding machine 12. The ram 16 plasticizes and advances resin towards the nozzle 14. Upon complete plasticization of the resin, the screw ram 16 is hydraulically advanced towards the end portion 22 of the barrel 20 to inject molten plastic through the nozzle 14 as is well known in the art.

The system 10 also includes a pressurized fluid supply 24 which supplies pressurized fluid, (i.e. typically nitrogen gas), to the nozzle 14 through a fluid control valve 26. The valve 26 controls the flow of pressurized fluid from the fluid supply 24 in synchronization with the injection of molten plastic from the nozzle 14 as is also well known in the art.

The system 10 further includes a mold or a mold body, generally indicated at 28. As illustrated in FIG. 1, the mold 28 comprises a two-plate mold body. One of the plates includes a locating ring 30 for locating the injection end of the nozzle 14. The locating ring 30 is mounted on a clamp plate 32 which, in turn, is fixedly connected to a cavity retainer plate or cavity plate 34. A sprue bushing 36 is disposed within the locating ring 30 and is supported by the clamp plate 32.

Leader pins 38 on the cavity plate 34 provide the male half of the male/female connection of the first plate with the second plate of the two-plate mold 28. In particular, the second plate includes leader pin bushings 40 (only one of which is shown) which slidably receive and retain the leader pins 38 therein in the closed position of the mold 28. The leader pin bushings 40 are retained within a core retainer plate 42. The core retainer plate 42 is fixedly connected to a support plate 44 which, in turn, is connected to an ejector retainer plate 46. The ejector retainer plate 46 is connected to an ejector plate 48 which, in turn, is supported by support pillars 50. The support plate 44 is also fixedly connected to the ends of a U-shaped ejector housing 52 to which the support pillars 50 are also connected.

The plate 46 supports a plurality of return pins 54, ejector pins 56 and a sprue puller pin 58 which extend toward the plate 34 and through the plates 42 and 44. The ejector pins 56 are provided for ejecting parts P formed within the mold 28. The sprue puller pin 58 is aligned with the sprue bushing 36.

As illustrated in FIG. 1, the parts P are interconnected by a sprue 60, a runner 62 and gates 64 which define a resin flow path from the sprue bushing 36 to cavities 66. Opposing surfaces of male and female mold parts 68 and 70, respectively, define the cavities 66. The mold parts 68 are supported on the plate 46 and the mold parts 70 are supported on the cavity retainer plate 34.

Referring now to FIG. 3, there is illustrated an embodiment of the present invention. In particular, the mold 28 includes an overflow reservoir 112 outside of a mold cavity 114 of the mold 28. Gas is introduced into the reservoir 112 through a passageway 116 formed by an insert 117. Gas flows from the valve 26, through the passageway 116 and through a fluid aperture. 118 which, in turn, extends through the resin reservoir 112 and into the part proper. Preferably, the flow of resin fills the resin reservoir 112 before the resin requirement for the mold part is complete so that the gas accomplishes the final mold cavity filling without breakthrough. Such construction allows for better tool construction with less maintenance.

Obviously, there are numerous choices of gas entry and exit devices possible for controlled gas entry and gas exit with respect to the part.

In the example of FIGS. 3 through 6 a garbage can 120 is formed and may be stacked, as illustrated in FIG. 5. This is true even though it is highly desirable to have a stronger rim 122 that will stay round to accept a corresponding lip. The size and shape of the garbage can 120 typically precludes the use of gas distribution from the sprue of the mold 28. For example, stacking considerations precludes the use of gas channels from the sprue. Also, the thin lip section 124 of the garbage can's rim 122 may prevent the introduction of gas directly into the rim 122 because of tooling considerations (i.e. thin steel sections) and part requirements.

Figure 7:
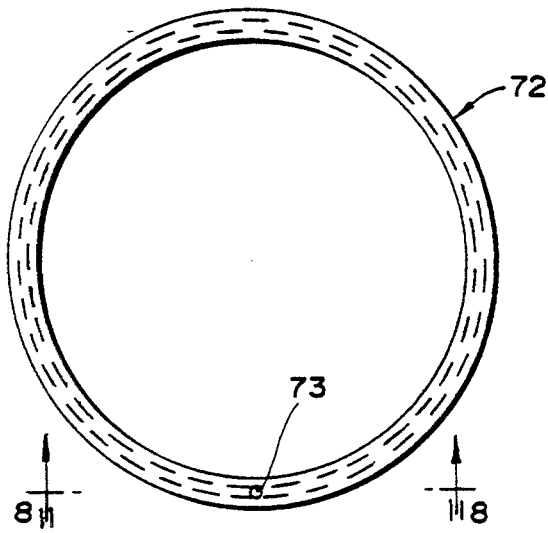
FIG. 7 is a top view illustrating a first endless hollow body portion.
Figure 9:
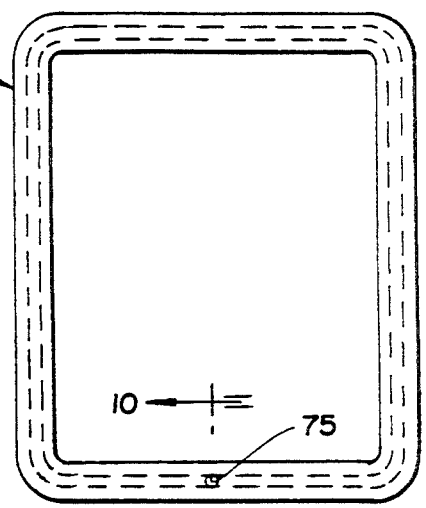
FIG. 9 is a top view illustrating a second endless hollow body portion.

Without departing from the scope of the present invention, FIGS. 7 and 9 illustrate first and second hollow endless bodies, generally indicated at 72 and 74, respectively, formed by the method and system of the invention by fluid injection through fluid apertures 73 and 75, respectively. The method and system include a pin, generally indicated at 76, which forms the fluid apertures 73 and 75 and which extends into a resin reservoir formed during resin, injection in the bodies 72 and 74. Also, one or more pins 76 may be utilized with or without the gas assistance from the nozzle in some applications.

A tip portion 78 of the pin 76 divides each of the fluid apertures into a pair of orifices 80 and 82 which extend in substantially opposite directions to distribute the resin in opposite directions to form first and second compartments 84 and 86 in each of the hollow-shaped bodies 72 and 74. The orifices 80 and 82 prevent the gas from taking one direction and also the gas and the resin do not have to travel very far. Alternatively, each of the fluid apertures terminates at a single orifice.

The tip portion 78 may be either relatively conductive or relatively non-conductive.

Gas entry into the bodies 71 and 74 from the pin 76 is preferably parallel to the resin flow path. The pressure of the gas may be at a higher pressure, lower pressure or a pressure equal to the pressure of the resin in the mold.

The gas may be vented through the pin 76 or may be vented at another location separate from the pin 76 to remove pressure from the part. Gas exit from the mold is preferably through the pin 76, but may be elsewhere in the mold or by pin retraction.

Figure 11:
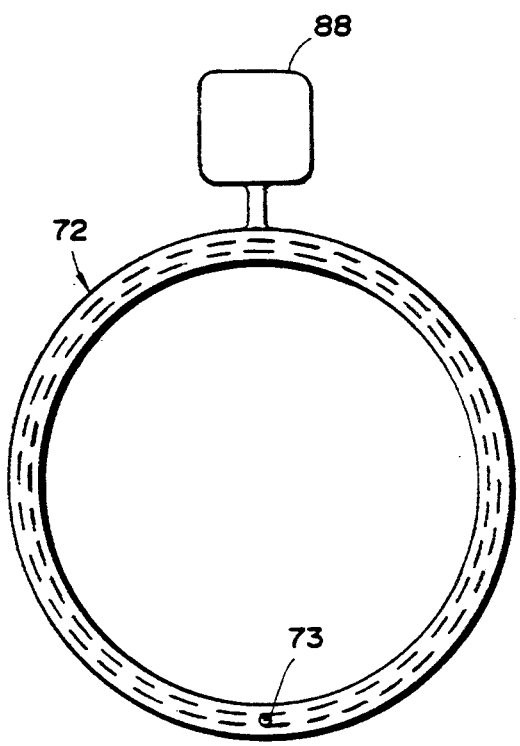
FIG. 11 is a top view of the first body portion and an associated spillover reservoir.

The system may allow spillover into a spillover reservoir 88, as indicated in FIG. 11, positioned substantially opposite the fluid aperture 73. The spillover reservoir 88 facilitates the creation of the endless hollow bodies 72 and 74 which are as close to endless as possible due to minor variations in process parameters.

The gate between resin reservoir 112 and the part proper is removed after the molding process is complete. Likewise, the gate between the reservoir 88 and the body 72 is also removed. Any resulting hole caused by the flow of gas to and from the part can be closed in any number of ways in order to prevent contamination within the part during a subsequent plastic processing step.

Also, with two fluid apertures into the mold cavity (i.e. spaced 180 degrees apart) a bulkhead may be formed within the hollow, body to define two separate compartments. The bulkhead would be formed approximately 90 degrees from each of the fluid apertures.

Figure 8:
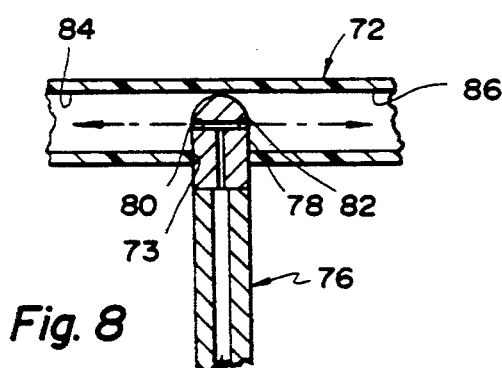
FIG. 8 is a view, partially broken away and in cross-section, taken along lines 8—8 in FIG. 7 during the forming process of the first body portion.
Figure 10:
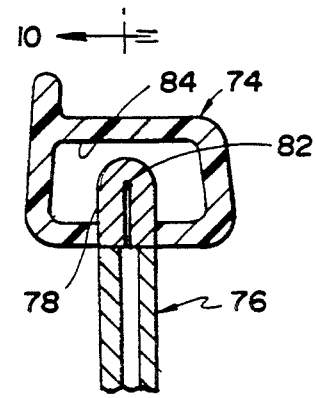
FIG. 10 is a view, partially broken away and in cross-section, taken along lines 10—10 in FIG. 9 during the forming process of the second body portion.
Figure 12:
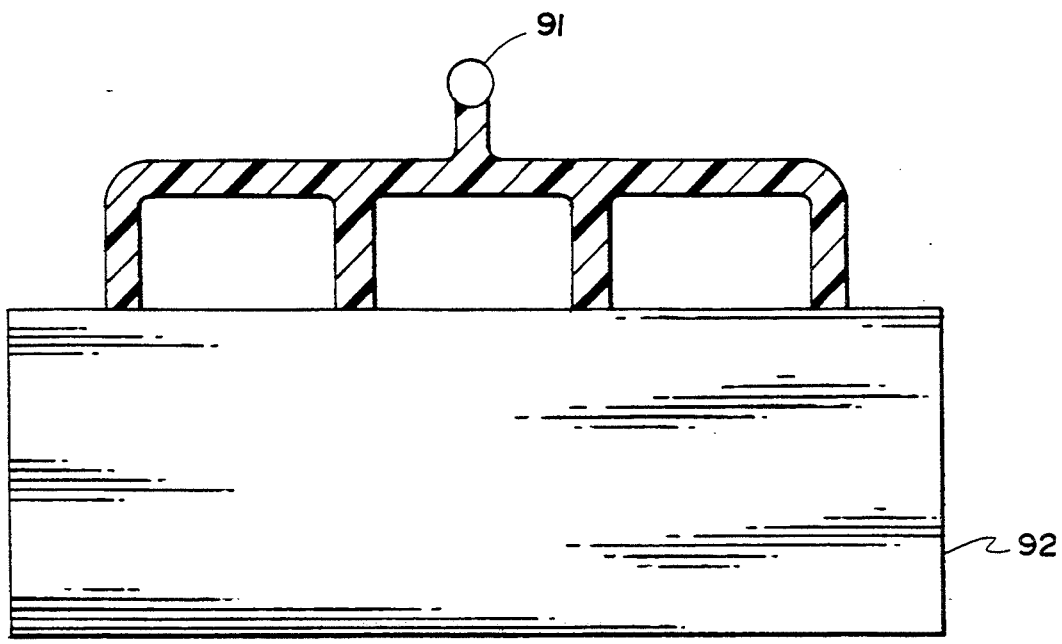
FIG. 12 is a view illustrating the invention and a multi-gate system.
Figure 13:
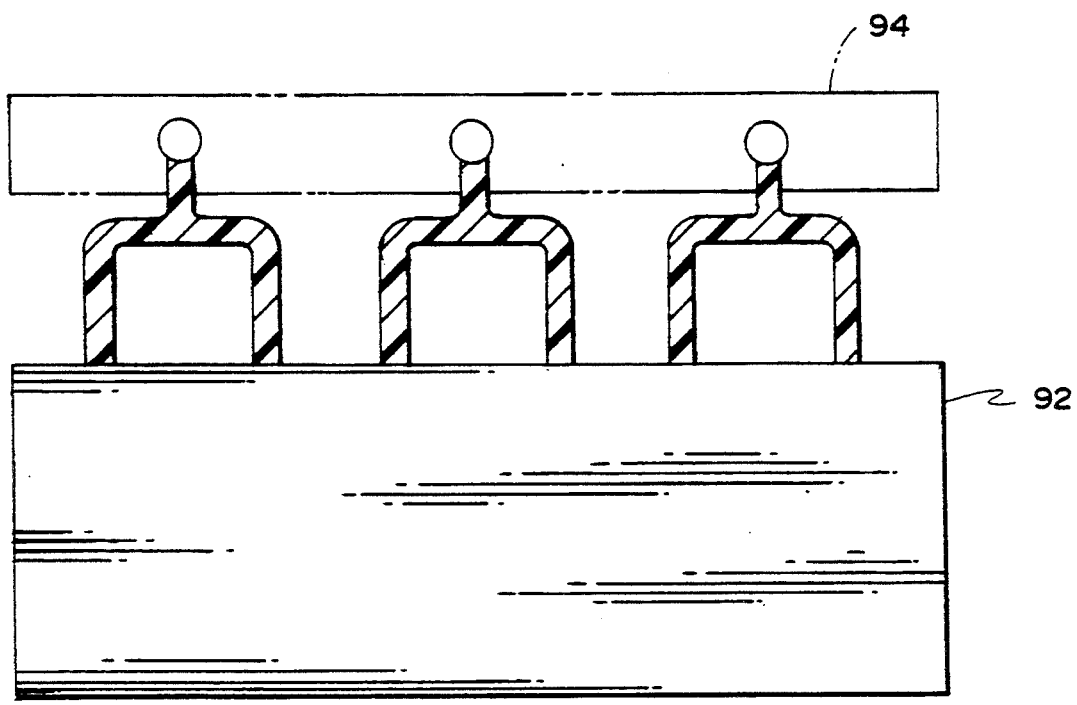
FIG. 13 is a view of the invention and a hot runner system.

The apparatus of FIGS. 3, 8 and 10 may be utilized with a regular sprue with a nozzle in a system having multiple resin flow apertures from a single sprue 91 into a part 92, as illustrated in FIG. 12, or a hot runner manifold 94 with a nozzle as illustrated in FIG. 13.

Figure 2:
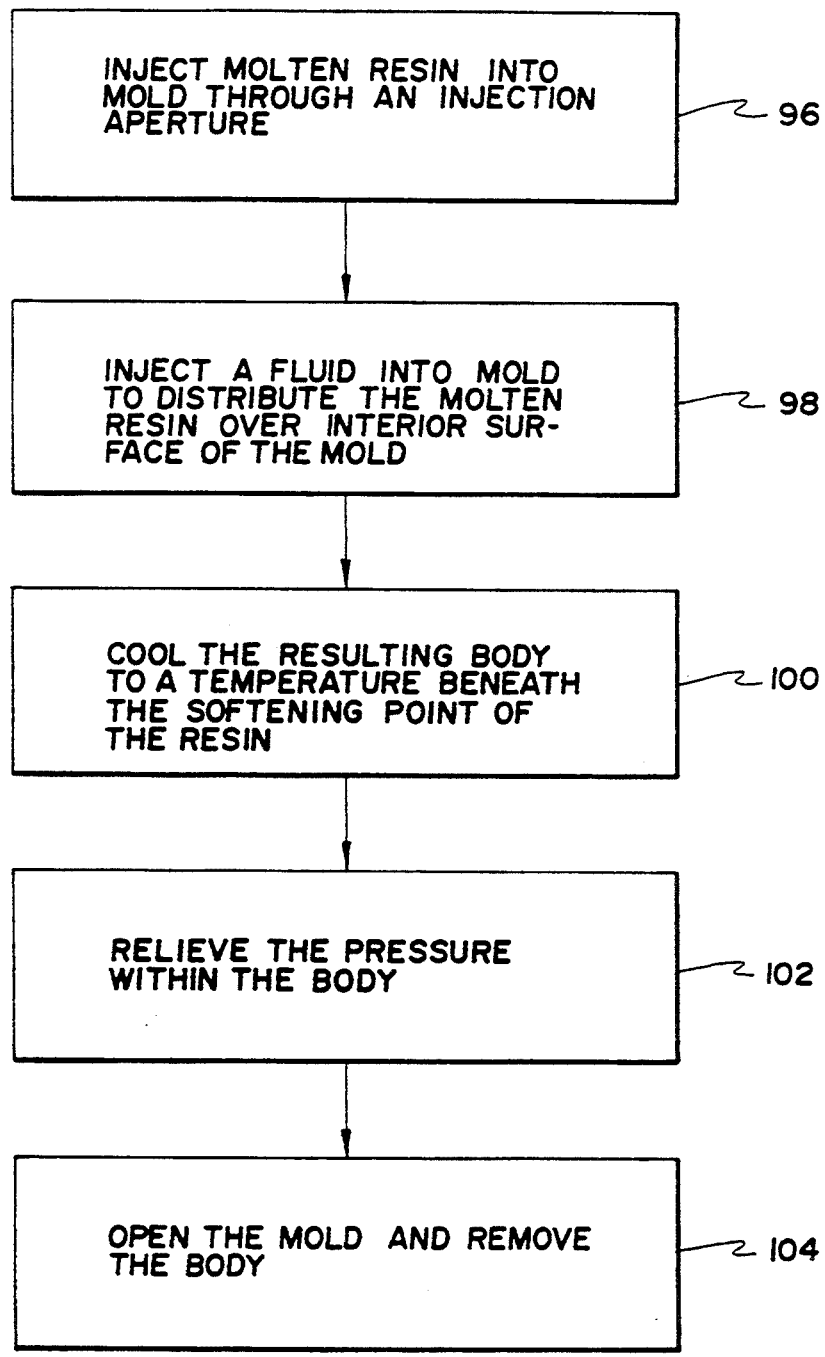
FIG. 2 is a block diagram illustrating the various steps of the method of the present invention.

Referring now to FIG. 2 in combination with FIG. 3, there is illustrated, in flowchart form, process steps of the method of the present invention.

In step 96, plastic resin is injected into the mold 28 through an injection aperture formed in the sprue bushing 36.

In step 98, gas is injected into the mold 28 through the fluid aperture 118 under control of the valve 26.

In step 100, the gas supports the plastic article or part in the mold cavity 66 against the interior surfaces thereof until the article cools.

In step 102, the gas is vented through an opening formed in the part and back through the gas passageway 116 and the aperture 118 under control of the valve 26. Obviously, numerous methods and devices are available to perform the pressure relieving step in a suitable manner.

In step 104, the mold 28 is opened to remove the part from the mold 28.

The method and system of the present invention provides numerous advantages. For example, when the pin 76 of FIGS. 8 and 10 includes a conductive tip portion 78, the molten resin heats the tip portion 78 to thereby prevent premature skin formation at the fluid aperture. Also, when a reciprocating pin is utilized, the tip portion breaks through any skin formation in the mold if the tip portion is non-conductive. If the tip portion is conductive the molten resin will seal the hole formed by the tip portion when the tip portion is retracted. Alternatively, if the fluid aperture is coaxial with the pin, pin retraction may cause a small vent hole to be formed in the part.

The method and system maintains pressure at a localized area of the mold to prevent formation of a sink mark during resin solidification. The method and system can be used to create hollow bodies throughout a part not attainable with a single gas orifice through the injection aperture. Furthermore, use of multiple resin reservoirs allows for part sectionalization of hollow bodies. As illustrated in the drawing figures and as described above, the article has a hollow plastic body portion of one piece construction formed by the pressurized fluid to define a closed seamless interior surface which extends about the perimeter of the article. In other words, the one-piece construction is seamless in that the construction is not defined by the abutment of edges which define a line, groove or ridge.

While the best mode for carrying out the invention has herein been described in detail, those familiar with the art to which this invention relates will recognize various alternative designs and embodiments for practicing the present invention as defined by the following claims.

What is claimed is:

1. In a plastic hollow article having a perimeter and being formed from a molten plastic resin by a fluid-assisted injection molding system including a mold having an article-defining cavity and an injection aperture wherein molten plastic resin is injected through the injection aperture and wherein pressurized fluid is communicated to the molten plastic resin through a separate fluid aperture in the mold to at least partially distribute the molten plastic resin, the improvement comprising:
the article having a hollow plastic body of one-piece construction formed by the pressurized fluid to define a closed seamless interior surface which extends at least partially about the perimeter of the article.

2. The plastic hollow article of claim 1 wherein:
the body portion is formed to define a hollow interior which extends completely about the perimeter of the article.

* * * * *